April 12, 1938. H. R. SCHUTZ 2,113,605
STENCILING APPARATUS
Filed Aug. 20, 1936 4 Sheets-Sheet 1
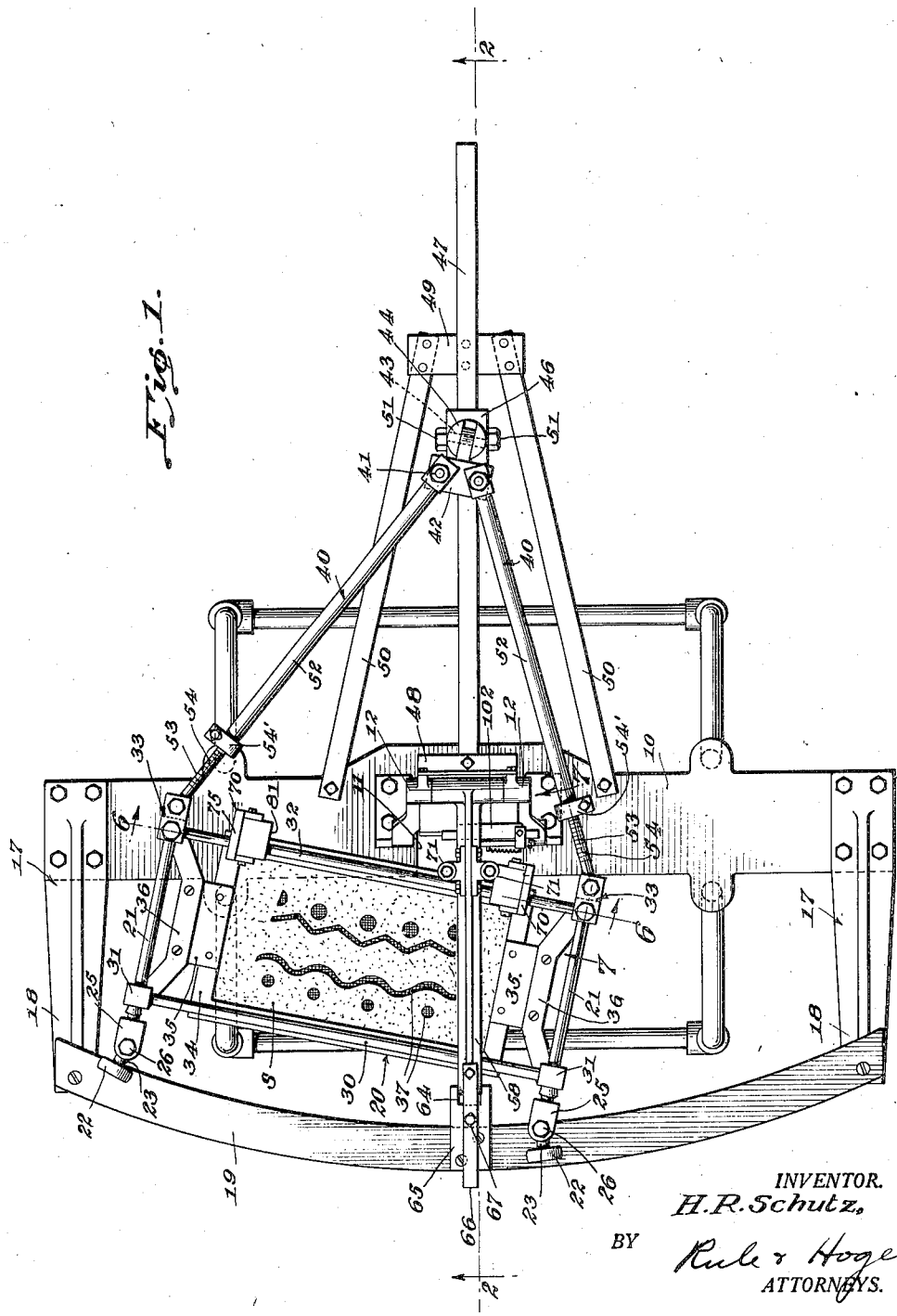
INVENTOR.
H. R. Schutz,
BY
ATTORNEYS.

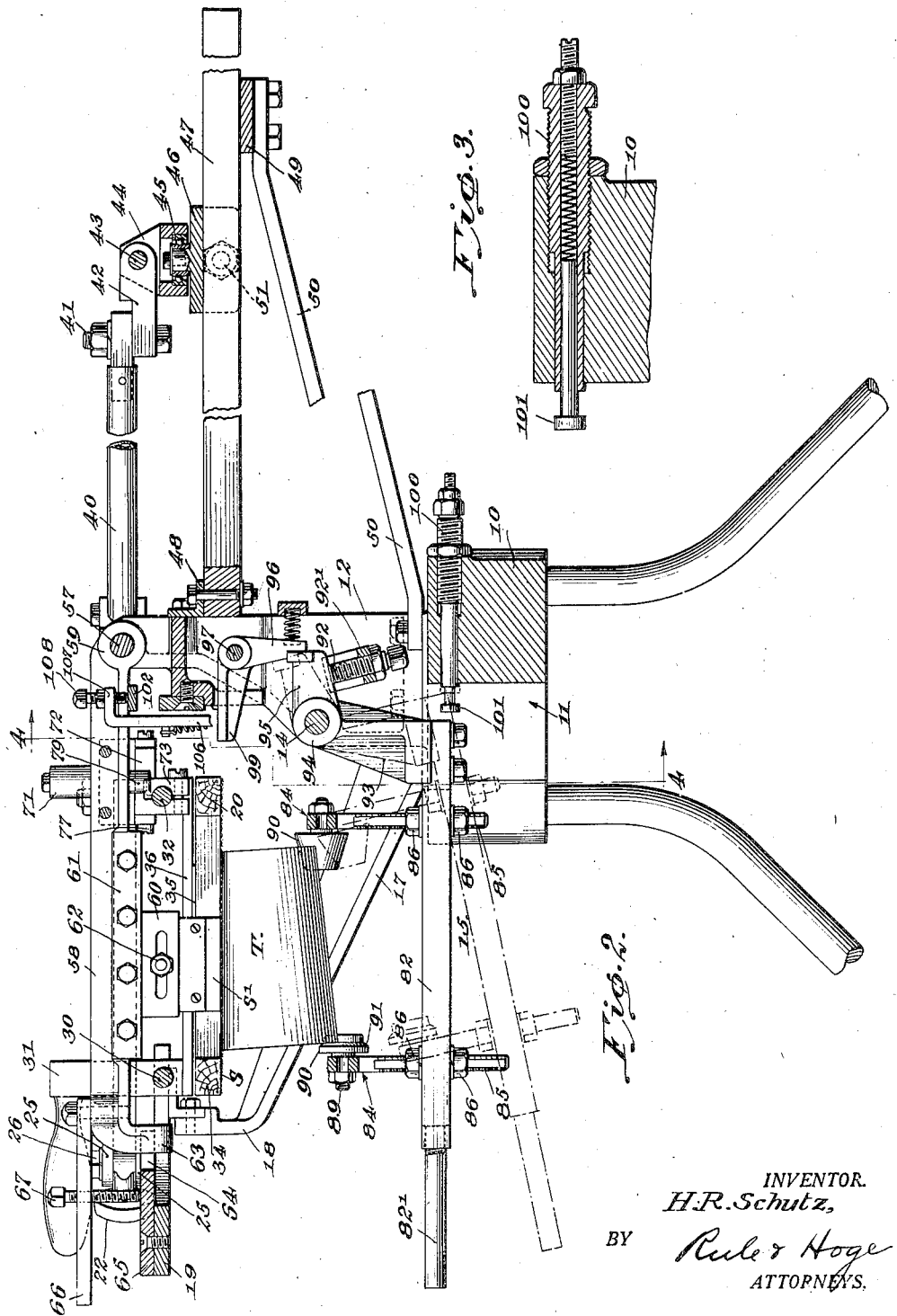

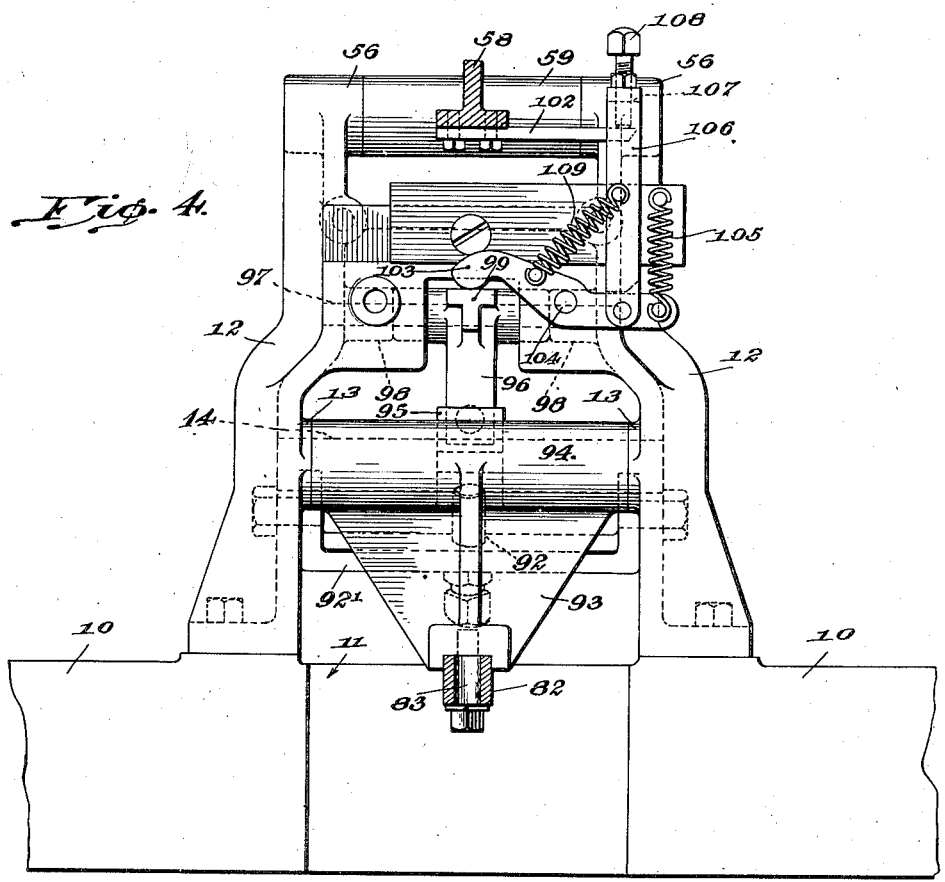
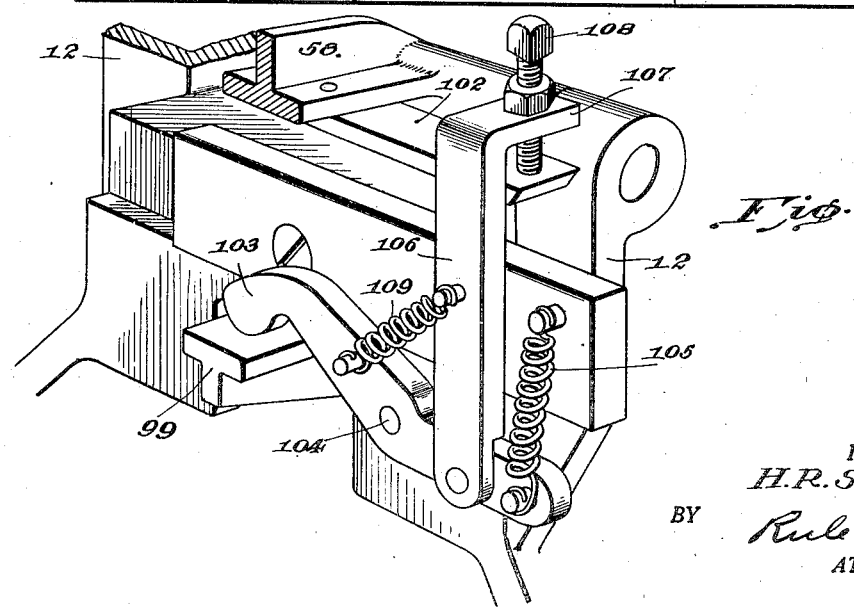

April 12, 1938.    H. R. SCHUTZ    2,113,605
STENCILING APPARATUS
Filed Aug. 20, 1936    4 Sheets-Sheet 4
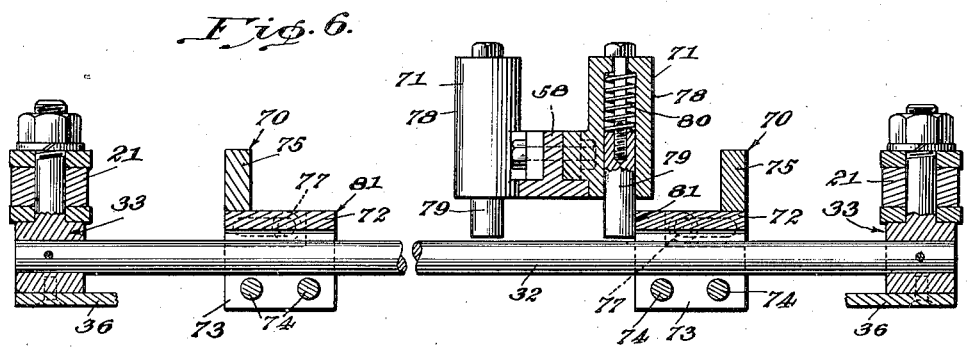
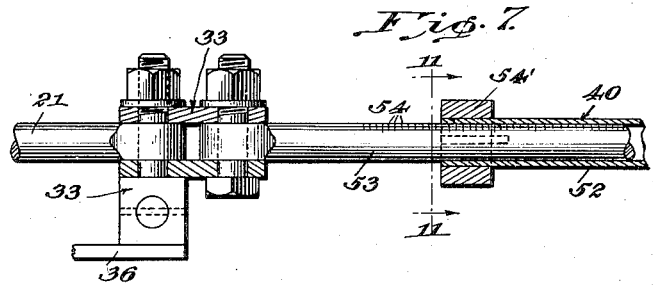
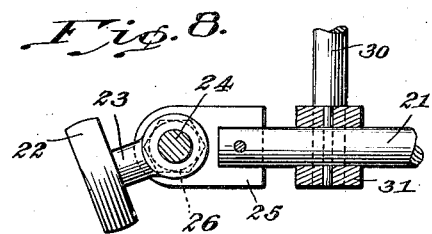
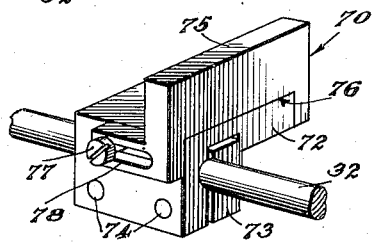
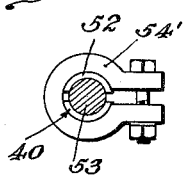
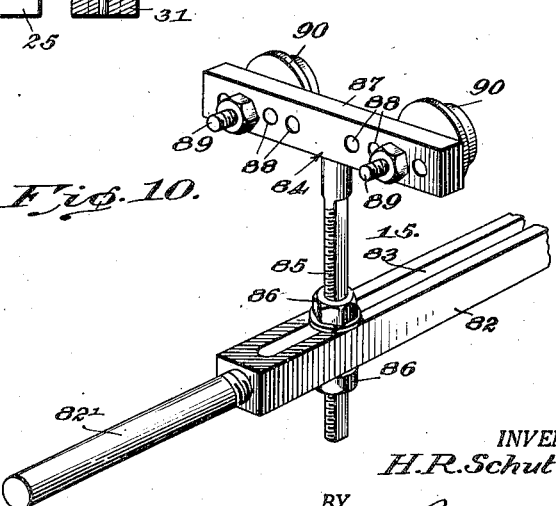
INVENTOR.
H. R. Schutz,
BY
Rule & Hoge
ATTORNEYS.

Patented Apr. 12, 1938

2,113,605

UNITED STATES PATENT OFFICE 2,113,605

STENCILING APPARATUS

Harold R. Schutz, Toledo, Ohio, assignor to Libbey Glass Company, a corporation of Ohio Application August 20, 1936, Serial No. 96,994

17 Claims. (Cl. 101—123)

The stenciling apparatus comprising the present invention is primarily adapted for use in applying a vitreous enamel composition or paint to articles of glassware such as tumblers, bottles, jars and the like, and to other articles of a vitreous or ceramic nature in the lettering or decorating thereof by a stenciling process.

The principal object of the invention is to provide an apparatus which will generally improve and simplify the operation of applying the vitreous enamel composition to such articles; which will materially increase the quantity of work performed as well as improve the quality and uniformity thereof; and which will lessen the labor and skill otherwise required in performing the same type of stenciling operations.

The invention is embodied in an apparatus of the type employing a stencil screen capable of oscillating movement while in tangential rolling contact with the surface of an article to be decorated and wherein the enamel composition is applied to the surface through the screen by the spreading action of a squeegee which is maintained in contact with the screen along the line of contact between the screen and surface undergoing decoration.

It is another object of the invention to provide an adjustable stop mechanism for arresting the oscillating movement of the stencil screen at the completion of each decorating operation and immediately prior to movement of the screen to either of its extreme positions, to enable the operator to manually elevate the squeegee from the screen to permit the enamel composition on the screen to pass under the squeegee and occupy a position ahead of the same prior to performance of the next decorating operation.

Another object of the invention is to provide an improved article support by which articles having tapered or inclined surfaces may be quickly and conveniently positioned in the machine with such surfaces in operative contact with the stencil screen.

Another object of the invention is to provide an automatic trip mechanism for lowering the article support upon elevation of the squeegee to automatically remove the decorated article from contact with the screen and facilitate substitution of an undecorated article in the apparatus.

Yet another object of the invention is to provide an apparatus of the type referred to in which the stencil screen is capable of oscillation in an arcuate path, the center of curvature of which may be shifted with respect to a given decorating zone and the radius of curvature of which may be varied in extent to accommodate articles having different degrees of peripheral curvature and slope.

A still further object of the invention is to provide a stencil screen frame which is adjustable to accommodate stencil screens of different sizes.

Other objects and advantages of the invention will appear hereinafter.

In the accompanying sheets of drawings:

Fig. 1 is a top plan view of a stenciling apparatus manufactured in accordance with the principles of the invention.

Fig. 2 is a longitudinal sectional view taken substantaily along the line 2—2 of Fig. 1.

Fig. 3 is an enlarged fragmentary sectional view of a shock absorbing mechanism employed in connection with the present invention.

Fig. 4 is a sectional view taken substantially along the line 4—4 of Fig. 2.

Fig. 5 is a fragmentary perspective view of an automatic trip mechanism employed in connection with the present inventon for lowering the article supporting carriage upon elevation of the squeegee from the stencil screen.

Fig. 6 is a sectional view taken substantially along the line 6—6 of Fig. 1.

Fig. 7 is a sectional view taken substantially along the line 7—7 of Fig. 1.

Fig. 8 is an enlarged detail top plan view, partly in section, of a stencil screen carriage supporting wheel employed in connection with the present invention.

Fig. 9 is a fragmentary perspective view of one of a pair of adjustable stops for arresting the movement of the stencil screen upon completion of each decorating operation.

Fig. 10 is a fragmentary perspective view of an adjustable article support employed in connection with the present invention, and Fig. 11 is a sectional view taken substantially along the line 11—11 of Fig. 7.

The apparatus involves in its general organization a base 10 (Figs. 1 and 2) in the form of an elongated, substantially rectangular casting provided with a recess 11 in the forward side thereof medially of its ends. Bolted or otherwise secured to the base 10 on opposite sides of the recess 11, and extending vertically upward therefrom, are a pair of standards or supports 12 (Fig. 4) having integrally formed aligned bearings 13 medially of their ends which serve to support therebetween a horizontal rock-shaft 14. An article supporting assembly 15, (Figs. 2 and 10), is pivotally mounted on the rock-shaft 14 and is designed to support thereon a tumbler T or like article to be decorated.

A pair of supporting members 17 having forwardly and upwardly extending supporting arms 18 are bolted or otherwise secured to the base 10 adjacent the ends thereof. The outer ends of the arms 18 support therebetween an arcuate or curved runway 19 which extends completely across the front of the apparatus.

Referring now to Fig. 1, a stencil screen assembly consists of a rectangular frame-like carriage 20 having parallel side bars 21, the forward ends of which are tractionally supported on the arcuate runway 19 by means of supporting wheels 22 mounted on spindles 23 which are angularly adjustable on king pins 24 (Fig. 8) which extend through a pair of clamping plates 25 suitably secured to the ends of the side bars 21. Clamping nuts 26 threaded on the king pins 24 serve to bind the spindles 23 between the plates 25 and secure the same in any desired angular position for proper tractional movement of the supporting wheels on the runway 19.

The side bars 21 (Fig. 1) are connected together at the forward ends thereof by means of a front transverse bar 30, corner fastenings 31 (Fig. 1) being provided for the purpose. A rear transverse bar 32 is secured to the rear ends of the side bars 21 by means of corner fastenings 33.

A stencil screen frame 34 (Figs. 1 and 2) is suspended from the carriage 20 by means of a pair of plates 35 carried by yokes 36 which are secured to the corner fastenings 31 and 33. A stencil screen S is secured to the underneath side of the frame 34 in any suitable manner, as for example, by gluing.

The screen S is provided with pervious portions 37 representing the design to be applied to the tumblers T positioned on the article support 15.

In order that the carriage 20 and screen S may be oscillated in an arcuate path, a pair of telescopic, extensible radius arms 40 are connected at their forward ends to respective corner fastenings 33. The rear ends of the arms 40 are secured by bolts 41 to a plate 42 which in turn is pivoted through a hinge pin 43 to a rotatable bracket 44 mounted on antifriction bearings 45 (Fig. 2) carried by a bearing plate 46, the latter being longitudinally adjustable in the apparatus. The plate 46 is slidably supported on a central guide bar 47 the inner end of which is secured to a cross bar 48 supported from the standards 12. The bar 47 is supported medially of its ends on a plate 49 which is in turn supported in an elevated position above the level of the base 10 and rearwardly thereof by means of tie rods 50. The bar 47 projects rearwardly of the plate 49 to permit the extensible radius arms 40 to be extended to their maximum lengths to accommodate the decoration of tumblers having slight peripheral slope and requiring a relatively long radius of oscillation for the stencil screen carriage 20. A pair of set screws 51 extending through the plate 46, engage the guide bar 47 and permit the plate 46 to be anchored on the bar 47 in any desired longitudinal position.

Referring now to Fig. 11, the telescopic radius arms 40 each consists of an outer tubular section 52 and an inner rod 53 which is slidable therein and which is provided with a series of graduations 54 which facilitate equalizing the length of the two arms 40 in the initial adjustment thereof. The outer tubular section 52 is slotted at its end and a clamp 54' serves to bind the end of the section 52 upon the inner rod 53 in any desired adjusted position.

From the above description, it will be seen that the stencil screen carriage 20 is capable of oscillating movement from the extreme position shown in Fig. 1 on one side of the apparatus to a corresponding position on the other side of the apparatus. Upon oscillation of the carriage 20, the wheels 22 describe an arc on the surface of the runway 19, the path of which is dependent upon the longitudinal setting of the adjustable plate 46 and the radius of curvature of which is dependent upon the effective length of the arms 40. The runway 19 is of sufficient width that the wheels 22 will not run over the edge thereof whether the plate 46 is in its fully extended or fully retracted position.

Referring now to Figs. 2 and 4, the upper ends of the standards 12 are provided with integral guides 56 having axially aligned bores. A transversely extending rock-shaft 57 is rockably supported between the guides 56. A squeegee arm 58 which is integrally formed on a sleeve 59 mounted on the rock-shaft 57, extends forwardly therefrom and overlies the stencil screen carriage 20. A squeegee holder 60 (Fig. 2) is secured medially to the squeegee arm 58 and is adjustable axially therealong by means of a clamping plate 61. A squeegee S' is suspended from the holder 60 by a pin and slot connection 62.

The free end 63 of the squeegee arm 58 extends downwardly and is guided in a slot 64 provided in a guide plate 65 supported centrally on the arcuate runway 19. A handle 66 is secured to the forward end of the squeegee arm 58 and projects forwardly of the apparatus to a point within convenient reach of the operator of the apparatus. An adjusting screw 67 extending through the handle 66 bears against the guide plate 65 to support the forward end of the arm 58.

In adjusting the squeegee S' to the screen S, the adjusting screw 67 is manipulated until the squeegee contacts the screen S. The screw 67 is then backed up approximately one-eighth of an inch and the arm 58 is lowered accordingly. By this method, the proper degree of pressure of the squeegee S' on the screen S is effected.

During oscillation of the carriage 20, the screen engages the tumbler T which is rotatably supported therebeneath and, by making a rolling line-contact therewith, causes the same to rotate in one direction or the other, depending upon the direction of movement of the screen. A small quantity of decorating material which is preferably of a vitreous enamel composition, is placed on the screen S and is forced through the pervious portions 37 thereof by means of the stationary squeegee S' (Fig. 2) which is centered upon the tumbler T and bears lightly upon the screen S. Upon completion of each stenciling operation, it is necessary that the squeegee be elevated from the enamel composition on the screen to clear the same prior to movement of the screen to its extreme position so that upon lowering of the squeegee into contact with the screen, prior to return movement of the latter, the enamel composition will occupy a position in advance of the squeegee. Heretofore in machines of this type, this clearing operation has been dependent upon the skill and judgment of the operator.

In the present instance the clearing operation just referred to is facilitated by the provision of a pair of abutments 70 (Figs. 6 and 9) mounted for longitudinal adjustment on the rear transverse bar 32 of the screen carriage 20. The abutments 70 are designed to cooperate with abutment-engaging members 71 provided on the squeegee arm 58 medially thereof in arresting movement of the carriage 20 after each stenciling operation but prior to movement of the carriage to the extreme limit of its stroke at either side of the apparatus, thus requiring that the operator elevate the squeegee arm 58 and squeegee S' before the carriage may be moved to its extreme position.

The abutments 70 are complementary in form and a description of one of these elements will suffice for both. Referring now to Fig. 9, the abutment 70 consists in an L-shaped bracket 72 which is clamped in any adjusted longitudinal position on the bar 32 by means of a clamping plate 73 through which clamping bolts 74 extend. An adjustable shoulder piece 75, provided with a cut-away portion 76 in the lower side thereof, straddles the bracket 72 and is adjustable on the same longitudinally of the bar 32 by means of clamping bolts 77 which extend through slots 78 provided in the shoulder piece 75 on opposite sides of the bracket 72.

The abutment-engaging members 71 (Fig. 6) are secured to the squeegee arm 58 medially and on opposite sides thereof. Each member 71 consists of an open ended tubular guide 78 in which there is slidably mounted a plunger 79 capable of being retracted into the guide 78 but normally held in extended position by means of a coil spring 80.

When assembled on the rear transverse bar 32 of the carriage 20, the abutments 70 each present a shoulder portion 81 (Fig. 6) which abuts against one or the other of the projecting plungers 79 when the carriage 20 approaches either of its extreme positions at the end of its stroke. Thus movement of the carriage is arrested and cannot be continued in the same direction until the operator manually engages the handle 66 and lifts or rocks the squeegee arm 58 upwardly about the axis of the rock-shaft 57 a sufficient distance that the plunger 79 clears the shoulder 81. After the plunger 79 has cleared the shoulder 81, the carriage may be moved to its extreme position with the guide portion of the abutment-engaging members 71 in contact with the shoulder piece 75 of the abutment 70. Upon elevation of the squeegee arm, the squeegee S' clears the enamel composition on the screen S and subsequent movement of the carriage to its extreme position causes the enamel composition on the screen to pass under the squeegee so that upon lowering of the same, the squeegees will occupy a position behind the composition prior to reversal of movement of the carriage during the next succeeding decorating operation. Upon lowering of the squeegee after the carriage 20 has been moved to its extreme position, the underneath surface of the squeegee arm comes to rest on, or at least closely approaches, the upper surface of the abutment 70 while the plunger 79 is forced into the guide portion 78 of its respective abutment-engaging member 71.

Referring now to Figs. 2 and 10, the article supporting assembly 15 consists of an elongated support 82 provided with a handle 82' and having a longitudinal slot 83 formed therein substantially coextensive therewith. A pair of T-shaped article supporting racks 84, each having a flat-sided threaded shank 85, are adjustably mounted on the support 82 for vertical and horizontal adjustment in the slot 83. Toward this end the shank 85 of each rack 84 extends vertically through the slot 83 and is adapted to be anchored in any desired vertical or horizontal position therein by means of lock nuts 86 which are received on the shanks 85 on opposite sides of the support 82. The flat sides of the shanks 85 engage the sides of the slot 83 to prevent turning of the racks in the same.

The horizontal upper portions 87 of each rack 84 are provided with a series of holes 88 adapted to selectively receive therein the ends of a pair of stub shafts 89 carrying article supporting rollers 90 at their outer ends. As shown in Fig. 2, the rollers 90 carried by one rack 84 are frusto-conical in formation and are designed to support the base portion of the tumbler T thereon. The rollers 90 carried by the other rack 84 include flanges 91 and serve to support the rim portion of the tumbler T and prevent the tumbler from creeping forwardly on the supporting rollers due to gravitational end-thrust. When the tumbler T is properly positioned in the apparatus, the rollers which support the base portion thereof occupy a position above the plane of the rollers which support the rim portion of the tumbler. Thus the tapered surface of the tumbler is permitted to make tangential line contact with the lower side of the screen S.

The entire article supporting assembly (Figs. 2 and 4) is adapted to be lowered by a pivotal movement of the same about the axis of the rock-shaft 14 upon manual elevation of the squeegee arm 58 in the manner previously described. Accordingly, the inner end of the support 82 is bolted or otherwise secured to a depending arm 93 (Fig. 2) provided on a bell crank lever 94 which is fulcrumed for rocking movement on the rock-shaft 14. The lever 94 is provided with a latch engaging arm 95 which projects rearwardly therefrom and which is adapted to be engaged by a depending spring pressed latch 96 pivotally mounted on a rock-shaft 97 supported in bearings 98 provided on the standards 12. In the latch engaging position of the arm 95, the article support 82 is held in a horizontal position in the apparatus with the tumbler T carried thereby in screen engaging position.

An adjusting screw 92 threadedly carried by a transverse bar 92' supported between the standards 12, engages the latch engaging arm 95 and determines the adjusted elevated position of the article support 82.

A forwardly extending latch operating arm 99 is integrally formed on the latch 96 and is adapted to be depressed upon manual lifting of the squeegee by the operator to cause the latch 96 to be moved out of the path of the arm 95 in manner subsequently to be described to permit the article support to drop by gravity to the dotted line position shown in Fig. 2. In this position access may be had to the decorated tumbler T for the purpose of substitution of an undecorated tumbler in its stead.

In order to adjustably limit the downward movement of the support 82, a hollow adjusting screw 100 (Figs. 2 and 3) threadedly received in the base 10 projects forwardly into the slot 11. A spring pressed plunger 101 telescopically received in the hollow screw 100 is adapted to be engaged by the rear end of the article support 82 to cushion the impact of the latter upon release of the same by the latch 96. The extent of threaded engagement between the hollow adjusting screw and the base determines the lowermost position of the support 82.

Referring now to Figs. 4 and 5, an automatic trip mechanism for depressing the latch operating arm 99 to release the article support 82 and permit the same to drop to its lowermost position is shown. This trip mechanism is adapted to function upon elevation of the squeegee by the operator of the apparatus after the design has been applied to the article and the stenciling operation is completed but prior to movement of the carriage 20 to its extreme position.

A transversely extending laterally projecting lifting bar 102 (Figs. 1, 2, 4 and 5) is secured to the underneath side of the rockable squeegee arm 58 adjacent the fulcrum thereof. A lever 103, pivoted at 104 to one of the stationary supports 12, bears against the upper side of the latch operating arm 99 at one end thereof. The other end of the lever 103 is connected by a spring 105 to the support 12 in such a manner that the lever 103 is normally held in engagement with the arm 99. A link 106 is pivotally connected at its lower end to a medial point on the lever 103 between the fulcrum 104 thereof and the point of attachment of the spring 105. The upper end of the link 106 extends laterally as at 107 over the lifting bar 102 and is provided with an adjusting screw 108 for the purpose of taking up any lost motion existing between the bar 102 and lateral portion 107 of the link 106. A spring 109 is connected at its ends to medial points on the lever 103 and link 106 to maintain the upper end 107 of the link 106 in superimposed position on the bar 102.

From the above description it will be seen that when the stencil screen carriage 20 approaches the end of its stroke in either direction and its movement is arrested by engagement of the members 70 and 71, the operator upon manually engaging the handle 66 and elevating the same to raise the squeegee S' from the screen S, causes the lifting bar 102 to transmit motion through the link 106 to the lever 103 which depresses the forwardly extending latch operating arm 99. As shown in Fig. 2, depression of the arm 99 causes the latch 96 to be moved out of the path of the latch engaging arm 95 which holds the article support 82 in its elevated position. The support 82 drops by gravity to the dotted line position (Fig. 2) thus permitting access to be had to the decorated tumbler T carried thereby. Lifting of the squeegee arm 58 in the manner just described permits the carriage 20 to be moved to its extreme position with the member 71 in engagement with the shoulder piece 75. In this position the operator releases the squeegee arm 58 which returns to its normal position with the squeegee S' in contact with the screen S and the enamel composition on the screen occupying a position ahead of the squeegee prior to commencement of the next succeeding decorating operation. After an undecorated tumbler T has been substituted in the apparatus, the operator manually engages the handle 82' and raises the article support 82. The spring pressed lever 96 which normally projects into the path of the latch engaging arm 95 is brushed aside momentarily and falls into its arm engaging position to maintain the support 82 in its elevated position with the tumbler T in contact with the underneath side of the screen S.

The apparatus herein described is extremely flexible in its adaptation to tumblers or other articles varying both in size and in their degree of peripheral slope. The lock nuts 86 shown in Fig. 2 permit the tumbler T to be adjusted to the screen S in such a manner that the proper line contact is made regardless of the diameter of the tumbler. The hollow adjusting screw 100 determines the lower position of the support 82 which varies with tumblers of different diameter in order that ample clearance for substitution of tumblers in the apparatus may be obtained. The adjusting screw 92 and bar 92' afford a safeguard against damage to the screen by limiting the upward movement of the article support 82 after substitution of an undecorated tumbler in the apparatus is made. The extensible radius arms 40 control the radius of oscillation of the stencil screen carriage 20 which varies for tumblers having different degrees of peripheral slope. The longitudinally adjustable plate 46 determines the center of oscillation of the carriage 20 and must be shifted one way or the other when the radius of oscillation is varied. The plate 46 also must be shifted in the initial adjustment of the apparatus to compensate for discrepancies existing by virtue of the arbitrary initial adjustment made to the article support 82 in applying the tumbler to the screen. The adjustment provided by the set screw 108 permits any lost motion existing in the various linkages of the trip mechanism, which drops the support 82 upon elevation of the squeegee arm 58, to be eliminated. The adjustment at 67 controls the degree of pressure applied to the screen S by the squeegee. Finally, the provision of the clamping nuts 26, which permit the angularity of the supporting wheels 22 on the king pins 24 to be adjusted, reduces frictional losses to a minimum and facilitates the work of the operator.

Modifications may be resorted to within the spirit and scope of my invention.

I claim:

1. In a stenciling apparatus, a substantially horizontally oscillatable stencil screen, a relatively stationary squeegee in contact with said screen, a normally horizontal support having a longitudinal slot therein positioned beneath said screen, a pair of racks vertically and longitudinally adjustable in said slot, and supporting rollers carried by the upper ends of said racks adapted to receive thereon an article to be decorated.

2. In a stenciling apparatus, a substantially horizontally oscillatable stencil screen, a relatively stationary squeegee in contact with said screen, a normally horizontal support having a longitudinal slot formed therein positioned beneath said screen, a pair of racks provided with shanks projecting through said slot, means securing said shanks in said slots for vertical or longitudinal adjustment therein, and a pair of supporting rollers carried by each of said racks and adapted to rotatably support thereon an article to be decorated.

3. An article support for positioning a tumbler in tangential rolling line contact with a stencil screen in an apparatus of substantially the character described comprising an elongated bar provided with a longitudinal slot substantially co-extensive therewith, a pair of T-shaped racks each having a head portion and a threaded shank projecting through said slot, a pair of clamping nuts on each of said shanks adapted to engage said bar therebetween to secure said shanks in a desired longitudinal or vertical position in said slot, and a pair of rollers carried by the head portion of each of said racks, said rollers being independently adjustable on said head portion laterally of said bar.

4. In a stencilling apparatus, a horizontally oscillatable stencil screen, a relatively stationary squeegee in contact with said screen, said squeegee being manually movable to a position out of contact with said screen, an article support for positioning an article in contact with said screen, releasable means for holding said support in a position wherein said article is in contact with the screen, and means operable upon and due solely to movement of said squeegee away from said screen for releasing said holding means.

5. In a stencilling apparatus, a horizontally oscillatable stencil screen, a relatively stationary squeegee in contact with said screen, said squeegee being tiltable to a position out of contact with said screen, an article support for positioning an article in contact with said screen, releasable means for holding said support in a position wherein said article is in contact with said screen, and means operable upon and due solely to tilting of said squeegee for releasing said holding means.

6. In a stencilling apparatus, a horizontally oscillatable stencil screen, a relatively stationary squeegee in contact with said screen, said squeegee being movable to a position out of contact with said screen, an article support for positioning an article in rolling contact with said screen, said support being movable under the action of gravity to a position wherein the article supported thereby is out of engagement with said screen, means for holding said support in a position wherein said article is in contact with said screen, and means for rendering said last mentioned means inoperative upon and due to movement of said squeegee away from said screen.

7. In a stencilling apparatus, an oscillatable stencil screen, a relatively stationary squeegee in contact with said screen, said squeegee being tiltable to a position out of contact with said screen, an article support for positioning an article in rolling contact with said screen, said support being pivoted for vertical swinging movement under the action of gravity to a position wherein the article supported thereby is out of engagement with said screen, means for holding said support in a position wherein said article is in contact with said screen, and means operable upon and due to tilting of said squeegee for rendering said last mentioned means inoperative to permit said support to swing to a position wherein said article is out of contact with the screen.

8. In a stencilling apparatus, a horizontally oscillatable stencil screen, a relatively stationary squeegee in contact with said screen, said squeegee being movable to a position out of contact with said screen, an article support for positioning an article in rolling contact with said screen, said support being movable under the action of gravity to a position wherein the article supported thereby is out of contact with said screen, a pivoted latch projecting into the path of movement of said support and adapted to engage said support to hold the same in a position wherein said article is in contact with said screen, and means operable upon and due to movement of said squeegee out of contact with said screen for withdrawing said latch from the path of movement of said support.

9. In a stencilling apparatus, a horizontally oscillatable stencil screen, a squeegee arm rockably supported above said screen, a squeegee carried by said arm and normally in contact with said screen but movable out of contact therewith upon movement of said arm in one direction, an article support for positioning an article to be decorated in contact with said screen, said support being movable under the action of gravity to a position wherein the article supported thereby is out of contact with said screen, a latch projecting into the path of said support and normally holding said support in a position wherein the article supported thereby is in contact with said screen, a lever for moving said latch out of the path of said support, and a link for transmitting motion from said squeegee arm to said lever upon and due to rocking movement of said arm to move said latch out of the path of said support.

10. In an apparatus for stencilling tumblers including a movable stencil screen, the combination with a rockable squeegee arm and a squeegee supported thereby, of an article support adapted to position an article in contact with said screen, said support being movable by the action of gravity to a position wherein the article is out of contact with said screen, releasable means for holding said support in position wherein said article is in contact with said screen, and instrumentalities operable upon and due to rocking movement of said arm to release said holding means.

11. In a stencilling apparatus, a movable stencil screen, a squeegee in contact therewith and movable to a position out of contact therewith, an article support movable by the action of gravity from a position wherein the article supported thereby is in contact with said screen to a position wherein the article is out of contact with said screen, a latch engaging arm on said support, a latch in the path of said arm, a latch operating arm projecting from said latch, a lever in contact with said latch operating arm and adapted upon being depressed to actuate the latter, a lifting lever carried by said squeegee, and a link connecting said levers.

12. In a stencilling apparatus, an oscillatable stencil screen carriage, a relatively stationary squeegee normally in contact with said screen, said squeegee being manually movable to an inoperative position out of contact with said screen, an abutment carried by said squeegee, and a pair of abutment engaging members mounted on said carriage and between which said abutment is positioned, said abutment engaging members being provided with shoulders adapted to engage said abutment to temporarily arrest the movement of said carriage during oscillation thereof in either direction with said squeegee in operative contact with said screen, said squeegee being adapted upon manual movement thereof to its inoperative position to clear said shoulders to permit said carriage to be moved to an extreme position.

13. In a stencilling apparatus, the combination with an oscillatable stencil screen carriage, including a stencil screen, movable from an extreme position on one side of the apparatus to a corresponding extreme position on the other side thereof, a squeegee normally in operative contact with said screen, said squeegee being manually movable to an inoperative position out of contact with said screen, of a stationary abutment positioned medially in the path of movement of said carriage, and a pair of abutment engaging members carried by said carriage and spaced apart on opposite sides of said abutment, said abutment engaging members being provided with shoulders adapted to engage said abutment to temporarily arrest movement of said carriage during oscillation thereof in either direction with said squeegee in operative screen engaging position, said abutment being adapted to clear said shoulders upon manual movement of said squeegee to its inoperative position to permit said carriage to be moved to an extreme position.

14. In a stenciling apparatus, the combination with an oscillatable stencil screen carriage movable from an extreme position on one side of the apparatus to a corresponding position on the other side thereof, a squeegee normally in operative contact with said screen, said squeegee being manually movable to an inoperative position out of contact with said screen, of a stationary abutment positioned medially in the path of movement of said carriage, a pair of abutment engaging members carried by said carriage and spaced apart on opposite sides of said abutment, said abutment engaging members being provided with shoulders adapted to engage said abutment to temporarily arrest movement of said carriage in either direction with said squeegee in operative screen engaging position, said abutment being adapted to clear said shoulders upon manual movement of said squeegee to its inoperative position to permit said carriage to be moved to an extreme position, and adjustable shoulder portions carried by the abutment engaging members and adapted to engage said abutment to determine the extreme positions of said carriage.

15. In a stenciling apparatus, a stencil screen and a squeegee therefor, a normally horizontal article support having a longitudinal slot therein positioned beneath said screen, a pair of racks vertically and longitudinally adjustable in said slot, and supporting rollers carried by the upper ends of said racks adapted to receive thereon an article to be decorated.

16. In a stenciling apparatus, a stencil screen and a squeegee therefor, a normally horizontal article support having a longitudinal slot formed therein positioned beneath said screen, a pair of racks provided with shanks projecting through said slot, means securing said shanks in said slots for vertical and longitudinal adjustment therein, and a pair of supporting rollers carried by each of said racks and adapted to rotatably support thereon an article to be decorated.

17. In a stenciling apparatus, a stencil screen, an article holder for rotatably supporting an article having a curved surface in tangential rolling line contact with said screen, said article holder being movable away from said screen by the action of gravity to remove the article supported thereby from contact with the screen, a squeegee normally in contact with said screen, means operable for effecting relative movement of said squeegee and screen toward and away from each other, means normally holding said article holder in a position whereby the article supported thereby is in contact with said screen, and means operable upon and due to separation of the squeegee and screen for releasing said holding means.

HAROLD R. SCHUTZ.